(12) United States Patent
Liang et al.

(10) Patent No.: US 11,467,475 B2
(45) Date of Patent: Oct. 11, 2022

(54) ELECTRONIC DEVICE AND CONCEALED CAMERA

(71) Applicant: BEIJING XIAOMI MOBILE SOFTWARE CO., LTD., Beijing (CN)

(72) Inventors: Jifei Liang, Beijing (CN); Liang Bai, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 390 days.

(21) Appl. No.: 16/689,518

(22) Filed: Nov. 20, 2019

(65) Prior Publication Data

US 2021/0003908 A1    Jan. 7, 2021

(30) Foreign Application Priority Data

Jul. 1, 2019  (CN) .......................... 201910586836.7

(51) Int. Cl.
*G03B 17/17* (2021.01)
*H04M 1/02* (2006.01)
*G02B 7/182* (2021.01)

(52) U.S. Cl.
CPC ........... *G03B 17/17* (2013.01); *G02B 7/1821* (2013.01); *H04M 1/0264* (2013.01)

(58) Field of Classification Search
CPC .................................................. H04M 1/0264
See application file for complete search history.

(56) References Cited

U.S. PATENT DOCUMENTS

2008/0143872 A1    6/2008 Lu

FOREIGN PATENT DOCUMENTS

| CN | 108881535 A | | 11/2018 | |
| CN | 109302552 A | * | 2/2019 | .......... H04N 5/2254 |
| CN | 109302552 A | | 2/2019 | |
| CN | 109547682 A | | 3/2019 | |
| CN | 109873938 A | * | 6/2019 | |
| KR | 1020190021639 A | * | 3/2019 | .......... H04M 1/0264 |

OTHER PUBLICATIONS

European Search Report in the European application No. 19211275.3, dated May 26, 2020.
First Office Action of the Chinese application No. 201910586836.7, dated Jul. 27, 2021.

* cited by examiner

*Primary Examiner* — Leon W Rhodes, Jr.
(74) *Attorney, Agent, or Firm* — Syncoda LLC; Feng Ma

(57) ABSTRACT

An electronic device having a concealable camera includes a shell, as well as an image capturing assembly and a retractable reflecting component arranged in the shell. An opening through which the reflecting component extends out of the shell is formed in the shell, and the reflecting component is configured to, during mage capturing, extend out through the opening and reflect a received mirror image onto the image capturing assembly for imaging of the image capturing assembly.

12 Claims, 4 Drawing Sheets

ELECTRONIC DEVICE AND CONCEALED CAMERA

CROSS-REFERENCE TO RELATED APPLICATION

The present application claims priority to Chinese patent application No. 201910586836.7 filed on Jul. 1, 2019, the disclosure of which is hereby incorporated by reference in its entirety.

BACKGROUND

Many existing electronic devices (for example, a mobile phone, a tablet computer, a notebook computer, an intelligent speaker, a smart television, a medical device and an underwater detection device) include cameras and can realize a photographing function and an image capturing function. Along with constant development of process technologies and constant increase of people's needs, full-screen displaying of an electronic mobile terminal device has gradually become a trend that users pursue. Arrangement of a front camera can usually affect a screen-to-body ratio of a full screen, and thus electronic devices having concealable cameras have emerged on the market.

SUMMARY

The present disclosure generally relates to the technical field of electronic products, and more particularly, to a concealable camera and an electronic device having a concealable camera.

According to a first aspect of the embodiments of the present disclosure, an electronic device having a concealable camera is provided, which includes a shell, as well as an image capturing assembly and a retractable reflecting component which are arranged in the shell. An opening through which the reflecting component extends out of the shell is formed in the shell, and the reflecting component is configured to, during image capturing, extend out through the opening and reflect a received mirror image onto the image capturing assembly for imaging of the image capturing assembly.

In some embodiments, a rotating member can further be included, which can be configured to drive the reflecting component to rotate when the reflecting component extends out of the shell.

In some embodiments, the reflecting component can include a retractable member and a reflecting member, and the retractable member can be configured to drive the reflecting member to extend out of or retract into the shell through the opening.

In some embodiments, one end of the rotating member can be connected with the reflecting member, and other end of the rotating member can be connected with the retractable member.

In some embodiments, the reflecting member can include a protective housing and a reflecting mirror positioned in the protective housing, and the protective housing can be connected with one end of the rotating member.

In some embodiments, a first rotating shaft can further be arranged in the protective housing, and the protective housing can be connected with one end of the rotating member through the first rotating shaft.

In some embodiments, the rotating member can be a rotating motor, the rotating motor can include a second rotating shaft, and the second rotating shaft of the rotating motor can cooperate with the first rotating shaft to drive the reflecting mirror through the first rotating shaft to rotate.

In some embodiments, the retractable member can be a stepper motor, a linear shaft at one end of the stepper motor can cooperate with the rotating member, and other end of the stepper motor can be fixedly arranged in the shell.

According to a second aspect of the embodiments of the present disclosure, a concealable camera is provided, which includes an image capturing assembly and a retractable reflecting component. The reflecting component is configured to, during image capturing, extend out and reflect a received mirror image onto the image capturing assembly for imaging of the image capturing assembly.

In some embodiments, a rotating member can further be included, which can be configured to drive the reflecting component to rotate when the reflecting component extends out.

In some embodiments, the reflecting component can include a retractable member and a reflecting member, and the retractable member can be configured to drive the reflecting member to extend out or retract.

In some embodiments, one end of the rotating member can be connected with the reflecting member, and the end of the rotating member can be connected with the retractable member.

In some embodiments, the reflecting member can include a protective housing and a reflecting mirror positioned in the protective housing, and the protective housing can be connected with one end of the rotating member.

In some embodiments, a first rotating shaft can further be arranged in the protective housing, and the protective housing can be connected with one end of the rotating member through the first rotating shaft.

In some embodiments, the rotating member can be a rotating motor, the rotating motor can include a second rotating shaft, and the second rotating shaft of the rotating motor can cooperate with the first rotating shaft to drive the reflecting mirror through the first rotating shaft to rotate.

In some embodiments, the retractable member can be a stepper motor, and a linear shaft of the stepper motor can cooperate with the rotating member.

It is to be understood that the above general descriptions and detailed descriptions below are only exemplary and explanatory and not intended to limit the present disclosure.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

LIST OF REFERENCE SYMBOLS

Figure 1:
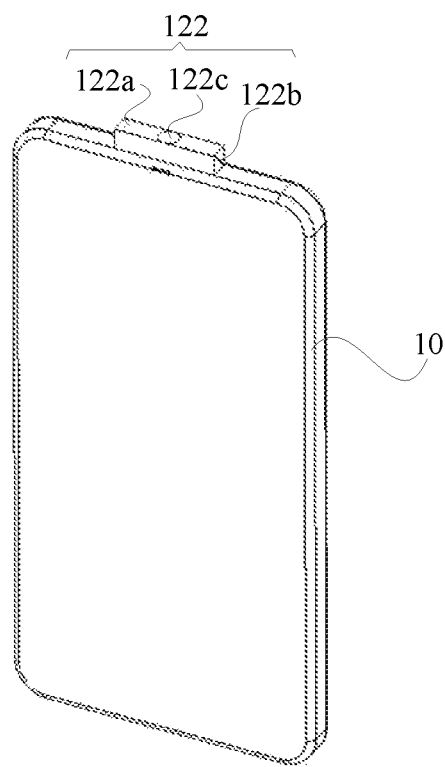
FIG. 1 is a structure diagram of an electronic device having a concealable camera, according to some embodiments.

10—shell;
11—image capturing assembly;

12—reflecting component;
121—retractable member;
122—reflecting member;
122a—protective housing;
122b—reflecting mirror;
122c—first rotating shaft; and
13—rotating member.

Specific embodiments of the present disclosure have been illustrated through the above accompanying drawings and more detailed descriptions will be made below. These accompanying drawings and textual descriptions are intended not to limit the scope of the concept of the present disclosure in any manner but to explain the concept of the present disclosure to those skilled in the art with reference to specific embodiments.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

To increase a screen-to-body ratio of a display screen and implementing a full screen of an electronic device such as a mobile phone, a front camera can usually be concealed, and a common concealing manner is to adopt a solution of driving the front camera to ascend and descend. Specifically, an accommodation cavity is formed in a shell of the electronic device, a mounting hole communicated with the accommodation cavity is formed in the shell, and the camera is arranged in the accommodation cavity through a retractable device such that the camera can extend out of or retract into the shell through the mounting hole. Moreover, a circuit board connected with the camera is usually a flexible circuit board, the circuit board is arranged in the accommodation cavity, and the circuit board cooperates with extension and retraction of the camera in a sliding manner. Specifically, when the camera is used, the retractable device drives the camera to extend out of the shell through the mounting hole, and meanwhile, the circuit board also slides and cooperates with the camera to complete operations of camera image capturing, photographing and the like; and when the camera is not used, the retractable device drives the camera to retract into the shell through the mounting hole, and the circuit board also slides with the camera for cooperating with retraction of the camera.

However, ascending and descending of an image capturing assembly of a camera can be limited by the space and thus can be relatively low in pixels. In addition, a flexible circuit board of the camera is also required to slide for cooperating with ascending and descending of the camera, so that there is such a risk that the circuit board is damaged in a sliding process. Moreover, the required circuit board is relatively long, relatively high in cost and relatively high in ratio to the space, so that a space utilization rate of the image capturing assembly of the camera is relatively low.

Various embodiments of the present disclosure provide a concealable camera and an electronic device having a concealable camera. An image capturing assembly can be fixedly arranged in a shell of the electronic device, a circuit board is not required to slide for cooperating with the image capturing assembly, and the circuit board can also be fixedly arranged in the shell, so that a good screen-to-body ratio of the electronic device is ensured, cost and an occupied space are reduced, and a space utilization rate is increased.

Figure 2:
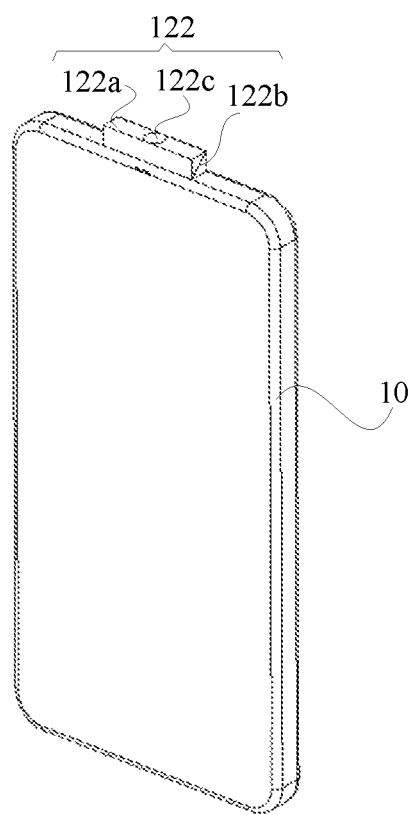
FIG. 2 is a structure diagram of an electronic device having a concealable camera after a reflecting component rotates, according to some embodiments.
Figure 3:
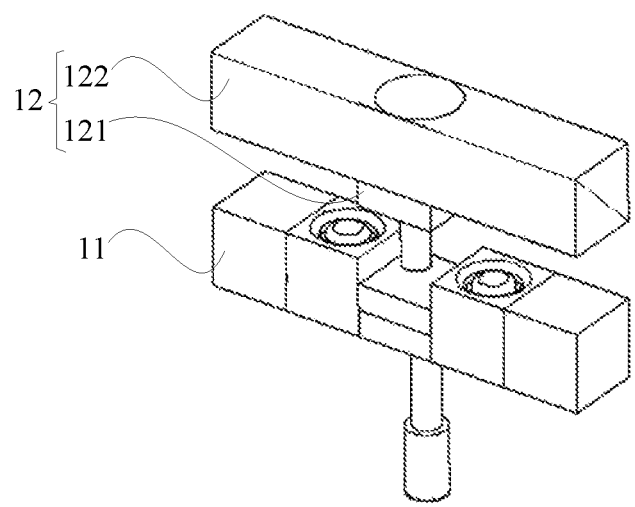
FIG. 3 is a structure diagram of a reflecting component of an electronic device having a concealable camera, according to some embodiments.
Figure 4:
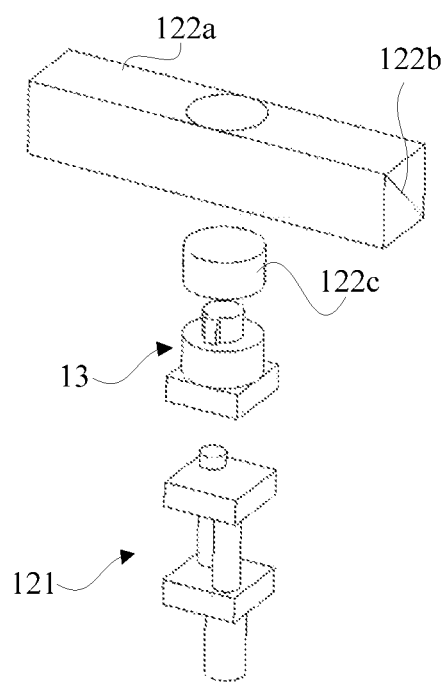
FIG. 4 is a disassembled structure diagram of a reflecting component of an electronic device having a concealable camera, according to some embodiments.

FIG. 1 is a structure diagram of an electronic device having a concealable camera, according to some embodiments. FIG. 2 is a structure diagram of an electronic device having a concealable camera after a reflecting component rotates, according to some embodiments. FIG. 3 is a structure diagram of a reflecting component of an electronic device having a concealable camera, according to some embodiments. FIG. 4 is a disassembled structure diagram of a reflecting component of an electronic device having a concealable camera, according to some embodiments.

Referring to FIGS. 1-4, according to the first aspect of the embodiments of the present disclosure, an electronic device having a concealable camera is provided. The electronic device having a concealable camera includes a shell 10, as well as a camera image capturing assembly 11 and a retractable reflecting component 12 which are arranged in the shell 10. Specifically, for example, for a mobile phone, the shell 10 is a shell of the mobile phone, the camera image capturing assembly 11 and the reflecting component 12 are arranged in the shell 10, and the reflecting component 12 is retractable. An opening through which the reflecting component 12 extends out of the shell 10 is formed in the shell 10, namely the opening is formed in the shell 10 and the reflecting component 12 can extend out of or retract into the shell 10 through the opening. The reflecting component 12 is configured to, during camera image capturing, extend out through the opening and reflect a received mirror image onto the image capturing assembly 11 for imaging of the image capturing assembly 11.

That is to say, the reflecting component 12 extends and retracts to reflect the mirror image to the image capturing assembly 11 by use of a reflecting action of the reflecting component 12 to achieve an imaging purpose. When a camera is required by image capturing, the retractable reflecting component 12 extends out through the opening in the shell 10, the external mirror image irradiates the reflecting component 12, the reflecting component 12 reflects the received mirror image onto the image capturing assembly 11, the image capturing assembly 11 executes a corresponding imaging operation according to the reflected mirror image.

Correspondingly, after image capturing is completed, the camera is not used, the retractable reflecting component 12 retracts into the shell 10 through the opening in the shell 10. In such a manner, in a process of using the camera for image capturing, the assembly is fixedly arranged in the shell 10, and a circuit board of the image capturing assembly is not required to slide for cooperating with the image capturing assembly 11 and can also be fixedly arranged in the shell 10, so that the image capturing assembly 11 can be effectively protected, meanwhile, a space required by the whole image capturing assembly can be reduced, a risk in damage to the circuit board is reduced, a purpose of reducing the cost and the space is achieved, a relatively high screen-to-body ratio of the electronic device is ensured, a ratio of the whole image capturing assembly to the space is also reduced, fabrication cost is reduced, and a space utilization rate is increased. In addition, the image capturing assembly 11 is arranged in the shell 10 and is less limited by the space, which is favorable for improving pixels of the image capturing assembly.

It is to be noted that, in the embodiments, the opening is formed in the shell 10 and a position of the opening can be set according to a practical design requirement or using requirement, etc. of the electronic device. Specifically, the opening can be formed in an end face of a top end of the shell 10 of the electronic device or lateral surfaces of two sides of the shell 10.

In the embodiments, the reflecting component 12 can be connected with the image capturing assembly 11 or arrangement positions thereof correspond to each other, as long as the reflecting component 12 is able to reflect the received mirror image onto the image capturing assembly 11 for imaging of the image capturing assembly 11. A specific arrangement manner can be selected and set according to the practical design requirement of the electronic device and an internal space structure of the electronic device.

In the embodiments, a specific length by which the reflecting component 12, when being used, can extend out or retract in can be set according to the arrangement position of the reflecting component 12 in the shell 10 of the electronic device and a requirement and will not be limited in the embodiments, as long as the reflecting component 12 is able to extend out of the shell 10 to receive the external mirror image.

In the embodiments, there are no other requirements made to a specific structure, components, pixels and the like of the image capturing assembly 11, as long as a function thereof can be realized. The image capturing assembly 11 can be an image capturing assembly in the related art, and a specific composition and structure thereof can refer to the related art and will not be elaborated in the embodiments.

Furthermore, in the embodiments, as shown in FIG. 3, the reflecting component 12 includes a retractable member 121 and a reflecting member 122, the retractable member 121 is configured to drive the reflecting member 122 to extend out of or retract into the shell 10 through the opening, and the reflecting member 122 is configured to receive a mirror image in an external environment and reflect the mirror image to the image capturing assembly 11 for imaging of the image capturing assembly 11. When image capturing is required, the retractable member 121 drives the reflecting member 122 to extend out through the opening, and the reflecting member 122 receives the external mirror image and reflects the mirror image to the corresponding image capturing assembly 11 for the image capturing assembly 11 to perform imaging according to the mirror image to complete image capturing.

The reflecting member 122 can be directly connected with the retractable member 121, thereby driving the reflecting member 122 to extend out of or retract into the shell 10, or the reflecting member 122 can also be connected with the retractable member 121 through another component, as long as the retractable member 121 is able to drive the reflecting member 122 to extend and retract.

In the embodiments, since the image capturing assembly 11 is arranged in the shell 10, a plurality of camera image capturing assemblies 11 can be arranged to improve the pixels of the camera. Correspondingly, for each image capturing assembly 11, there is a reflecting member 122 corresponding to this image capturing assembly 11, and the plurality of image capturing assembly 11 can also use the same reflecting member 122.

In the embodiments, it is to be noted that functions of photographing, video recording, face detection, face unlocking and the like can be realized by image capturing of the image capturing assembly.

Furthermore, based on the abovementioned embodiments, in the embodiment, as shown in FIG. 4, the electronic device having a concealable camera further includes a rotating member 13, and the rotating member 13 is configured to drive the reflecting component 12 to rotate when the reflecting component 12 extends out of the shell 10. Specifically, when image capturing is required, the retractable reflecting component 12 extends out of the shell 10 through the opening, a rotating component drives the reflecting member 122 to rotate, and then the reflecting member 122 can receive mirror images in different directions, so that a utilization rate of the camera is increased. For example, when the mobile phone is required to use a rear camera for image capturing, the retractable reflecting member 122 can extend out of the shell 10 through the opening, and the rotating component can drive the reflecting component 12 to rotate 180° to receive a mirror image behind the mobile phone to complete image capturing a scenery behind. In such a manner, the front camera and the rear camera use the same image capturing assembly, so that the utilization rate of the camera can be effectively increased, and meanwhile, slotting for mounting the rear camera on a back surface of the electronic device is also avoided to improve aesthetics and integrity of the appearance of the mobile phone. In addition, in the related art, the pixels of the front camera is usually lower than the pixels of the rear camera, while in the embodiments, the front camera and the rear camera share the same image capturing assembly and the image capturing assembly 11 is positioned in the shell 10 and is less limited by the space, so that it can be ensured that both the front camera and the rear camera have high pixels, and camera image capturing performance of the electronic device is improved.

It is to be noted that, in the embodiments, an arrangement position of the rotating member 13 can be between the retractable member 121 and the reflecting member 122 and the rotating member 13 can also be arranged between an image capturing assembly and the retractable member 121. Specifically, it can be selectively arranged according to the practical design requirement and a space condition, as long as a function thereof is able to be realized.

In the embodiments, there are no other requirements made to a specific structure, shape, size and the like of the rotating member 13, as long as the reflecting component 12 is able to be driven to rotate. The rotating member 13 can be a rotating motor, a rotatable turntable, a rotating shaft and the like, and there are no limits made in the embodiments.

In the embodiments, an angle by which the second rotating shaft 13 can drive the reflecting component 12 to rotate can be 0° to 360° to implement omnidirectional mirror image reflection. Specifically, the rotating angle can be selected and set according to the practical requirement of the electronic device, an arrangement manner for the reflecting component and the like.

Furthermore, in the embodiments, as shown in FIG. 3 and FIG. 4, one end of the rotating member 13 is connected with the reflecting member 122 and other end of the rotating member 13 is connected with the retractable member 121, namely the rotating member 13 is arranged between the reflecting member 122 and the retractable member 121. When image capturing is required, the retractable member 121 drives the rotating member 13 and the reflecting member 122 to extend out at first, the reflecting member 122 extends out of the shell 10 through the opening, and then the rotating member 13 drives the reflecting member 122 to rotate to complete front or rear image capturing or image capturing at another angle.

In the embodiments, the reflecting member 122 can be any optical element with the reflecting action. Specifically, in the embodiments, as shown in FIG. 1 to FIG. 4, the reflecting member 122 includes a protective housing 122a and a reflecting mirror 122b positioned in the protective housing 122a. The protective housing 122a can act to protect the reflecting mirror 122b to avoid the reflecting mirror 122b being damaged when being used. The protective housing 122a is connected with one end of the rotating member 13, and after the reflecting member 122 extends out of the shell 10, the rotating member 13 can drive the protective housing 122a to rotate to further drive the reflecting mirror 122b in the protective housing 122a to rotate to a required angle for camera image capturing.

In the embodiments, as shown in FIG. 4, in a specific example of the embodiments, a first rotating shaft 122c is further arranged in the protective housing 122a, and the protective housing 122a is connected with one end of the rotating member 13 through the first rotating shaft 122c. The rotating member 13 can rotate to drive the first rotating shaft 122c to rotate to further drive the reflecting mirror 122b in the protective housing 122a to rotate to implement image capturing at different angles. Both the reflecting mirror 122b and the first rotating shaft 122c are arranged in the protective housing 122a. In a possible example, as shown in FIG. 4, the first rotating shaft 122c can be arranged at a position close to a middle portion of the protective housing 122a such that the first rotating shaft 122c can drive the protective housing 122a to rotate stably, while the reflecting mirror 122b is divided into two portions, which are positioned on two sides of the protective housing 122a respectively.

In the embodiments, the rotating member 13 can be a rotating motor, the rotating motor includes a second rotating shaft, and the second rotating shaft of the rotating motor cooperates with the first rotating shaft 122c to drive the reflecting mirror 122b through the first rotating shaft 122c to rotate. Specifically, the second rotating shaft of the rotating motor drives the first rotating shaft 122c to rotate to further drive the reflecting mirror 122b in the protective housing 122a to rotate.

In the embodiments, the second rotating shaft of the rotating motor cooperates with the first rotating shaft 122c and a specific cooperating manner is not limited in the embodiments, as long as the second rotating shaft of the rotating motor is able to drive the reflecting mirror 122b through the first rotating shaft 122c to rotate. Specifically, as shown in FIG. 4, a bump can be arranged on a sidewall of the second rotating shaft of the rotating motor, and a groove matched with the bump is formed in the surface, facing the rotating motor, of the first rotating shaft 122c, so that the second rotating shaft of the rotating motor can cooperate with the first rotating shaft 122c and drive the first rotating shaft 122c to rotate.

In the embodiments, the retractable member 121 can be a stepper motor, and the stepper motor converts a pulse signal into linear displacement, thereby implementing extension and retraction. A linear shaft at one end of the stepper motor cooperates with the rotating member 13 and other end of the stepper motor is fixedly arranged in the shell 10. That is to say, the stepper motor, when running, can drive the rotating member 13 to move linearly to further drive the first rotating shaft 122c cooperating with the rotating member 13 to move linearly, thereby implementing linear extension and retraction of the reflecting member 122.

In the embodiments, the linear shaft cooperates with the rotating member 13 and a specific cooperating manner is not limited in the embodiments, as long as the linear shaft of the stepper motor is able to drive the rotating member 13 to move linearly.

The electronic device having a concealable camera provided in the embodiments further includes the rotating member 13, and the rotating member 13 is configured to drive the reflecting component 12 to rotate when the reflecting component 12 extends out of the shell 10. Specifically, when image capturing is required, the retractable reflecting component 12 extends out of the shell 10 through the opening, the rotating component drives the reflecting member 122 to rotate, and then the reflecting member 122 can receive the mirror images in different directions, so that the utilization rate of the camera is increased. For example, when the mobile phone is required to use the rear camera for image capturing, the retractable reflecting member 122 can extend out of the shell 10 through the opening, and the rotating component can drive the reflecting component 12 to rotate 180° to receive the mirror image behind the mobile phone to complete image capturing the scenery behind. In such a manner, the front camera and the rear camera use the same image capturing assembly, so that the utilization rate of the camera can be effectively increased, and meanwhile, slotting for mounting the rear camera on the back surface of the electronic device is also avoided to improve the aesthetics and integrity of the appearance of the mobile phone. In addition, in the related art, the pixels of the front camera is usually lower than the pixels of the rear camera, while in the embodiments, the front camera and the rear camera share the same image capturing assembly and the image capturing assembly 11 is positioned in the shell 10 and is less limited by the space, so that it can be ensured that both the front camera and the rear camera have high pixels, and camera image capturing performance of the electronic device is improved.

According to the second aspect of the embodiments of the present disclosure, a concealable camera is provided, which includes an image capturing assembly 11 and a retractable reflecting component 12. The reflecting component 12 is configured to, during image capturing, extend out and reflect a received mirror image onto the image capturing assembly 11 for imaging of the image capturing assembly 11. That is to say, the reflecting component 12 extends and retracts to reflect the mirror image to the image capturing assembly 11 by use of a reflecting action of the reflecting component 12 to achieve an imaging purpose.

When the camera is needed for image capturing, the retractable reflecting component 12 extends out, the external mirror image irradiates the reflecting component 12, the reflecting component 12 reflects the received mirror image onto the image capturing assembly 11, the image capturing assembly 11 executes a corresponding imaging operation according to the reflected mirror image. Correspondingly, after image capturing is completed, the camera is not used, the retractable reflecting component 12 retracts in. In such a manner, in a process of using the camera for image capturing, the image capturing assembly 11 is fixedly arranged and is not required to extend and retract, and a circuit board of the image capturing assembly is also not required to slide for cooperating with the image capturing assembly and can also be fixedly arranged, so that a space required by the whole image capturing assembly can be reduced, a risk in damage to the circuit board is reduced, a purpose of reducing the cost and the space is achieved, a ratio of the image capturing assembly to the space is reduced, fabrication cost is reduced, and a space utilization rate is increased. In addition, the image capturing assembly is not required to extend and retract and is less limited by the space, which is favorable for improving pixels of the image capturing assembly.

Furthermore, in the embodiments, the reflecting component 12 includes a retractable member 121 and a reflecting member 122, the retractable member 121 is connected with the reflecting member 122, the retractable member 121 is configured to drive the reflecting member 122 to extend out or retract in, and the reflecting member 122 is configured to receive a mirror image in an external environment and reflect the mirror image to the image capturing assembly 11 for imaging of the image capturing assembly 11. When image capturing is required, the retractable member 121 drives the reflecting member 122 to extend out, and the reflecting member 122 receives the external mirror image and reflects the mirror image to the corresponding image capturing assembly 11 for the image capturing assembly 11 to perform imaging according to the mirror image to complete image capturing.

In the embodiments, a plurality of camera image capturing assemblies 11 can be arranged to improve the pixels of the camera. Correspondingly, for each image capturing assembly 11, there is a reflecting member 122 corresponding to this image capturing assembly 11, and the plurality of image capturing assembly 11 can use the same reflecting member 122. It is to be noted that functions of photographing, video recording, face detection, face unlocking and the like can be realized by image capturing of the image capturing assembly 11.

The embodiments provide the concealable camera, which includes an image capturing assembly 11 and a retractable reflecting component 12. The reflecting component 12 is configured to, during image capturing, extend out and reflect a received mirror image onto the image capturing assembly 11 for imaging of the image capturing assembly 11. That is to say, the reflecting component 12 extends and retracts to reflect the mirror image to the image capturing assembly 11 by use of a reflecting action of the reflecting component 12 to achieve an imaging purpose. When the camera is required by image capturing, the retractable reflecting component 12 extends out, the external mirror image irradiates the reflecting component 12, the reflecting component 12 reflects the received mirror image onto the image capturing assembly 11, the image capturing assembly 11 executes a corresponding imaging operation according to the reflected mirror image.

Correspondingly, after image capturing is completed, the camera is not used, the retractable reflecting component 12 retracts in. In such a manner, in a process of using the camera for image capturing, the image capturing assembly 11 is fixedly arranged and is not required to extend and retract, and a circuit board of the image capturing assembly is also not required to slide for cooperating with the image capturing assembly and can also be fixedly arranged, so that a space required by the whole image capturing assembly can be reduced, a risk in damage to the circuit board is reduced, a purpose of reducing the cost and the space is achieved, a ratio of the image capturing assembly to the space is reduced, fabrication cost is reduced, and a space utilization rate is increased. In addition, the image capturing assembly is not required to extend and retract and is less limited by the space, which is favorable for improving pixels of the image capturing assembly.

Furthermore, based on the abovementioned embodiments, in the embodiment, the concealable camera further includes a rotating member 13, and the rotating member 13 is configured to drive the reflecting component 12 to rotate when the reflecting component 12 extends out. Specifically, when image capturing is required, the retractable reflecting component 12 extends out, a rotating component drives the reflecting member 122 to rotate, and then the reflecting member 122 can receive mirror images in different directions, so that a utilization rate of the camera is increased. For example, when an electronic device such as a mobile phone is required to use a rear camera for image capturing, the retractable reflecting member 122 can extend out, and the rotating component can drive the reflecting component 12 to rotate 180° to receive a mirror image behind the mobile phone to complete image capturing a scenery behind. In such a manner, the front camera and the rear camera use the same image capturing assembly, so that a utilization rate of the camera can be effectively increased, and meanwhile, slotting for mounting the rear camera on a back surface of the electronic device is also avoided to improve aesthetics and integrity of the appearance of the mobile phone. In addition, in the related art, the pixels of the front camera is usually lower than the pixels of the rear camera, while in the embodiments, the front camera and the rear camera share the same image capturing assembly and the image capturing assembly 11 is not required to extend and retract and is less limited by the space, so that it can be ensured that both the front camera and the rear camera have high pixels, and camera image capturing performance of the camera is improved.

In the embodiments, an arrangement position of the rotating member 13 can be between the retractable member 121 and the reflecting member 122 and the rotating member 13 can also be arranged between the image capturing assembly 11 and the retractable member 121. Specifically, it can be selectively arranged according to a practical design requirement and a space condition, as long as a function thereof is able to be realized.

In the embodiments, there are no other requirements made to a specific structure, shape, size and the like of the rotating member 13, as long as the reflecting component 12 is able to be driven to rotate. The rotating member 13 can be a rotating motor, a rotatable turntable, a rotating shaft and the like, and there are no limits made in the embodiments. In the embodiments, an angle by which the rotating member 13 can drive the reflecting component 12 to rotate can be 0° to 360° to implement omnidirectional mirror image reflection.

Furthermore, in the embodiments, one end of the rotating member 13 is connected with the reflecting member 122 and other end of the rotating member 13 is connected with the retractable member 121, namely the rotating member 13 is arranged between the reflecting member 122 and the retractable member 121 in a manner that one end of the rotating member 13 is connected with the reflecting member 122 and the other end of the rotating member 13 is connected with the retractable member 121. When image capturing is required, the retractable member 121 drives the rotating member 13 and the reflecting member 122 to extend out at first, and then the rotating member 13 drives the reflecting member 122 to rotate to complete image capturing at different angles.

In the embodiments, the rotating member 13 is a rotating motor, the rotating motor includes a second rotating shaft, and the second rotating shaft of the rotating motor cooperates with a first rotating shaft 122c to drive a reflecting mirror 122b through the first rotating shaft 122c to rotate. Specifically, the second rotating shaft of the rotating motor rotates to drive the first rotating shaft 122c to rotate to further drive the reflecting mirror 122b in a protective housing 122a to rotate.

Furthermore, in the embodiments, the retractable member 121 is a stepper motor, and a linear shaft at one end of the stepper motor cooperates with the rotating member 13. The stepper motor, when running, can convert a pulse signal into linear displacement to drive the rotating member 13 to move linearly to further drive the first rotating shaft 122c cooperating with the rotating member 13 to move linearly, thereby implementing linear extension and retraction of the reflecting member 122.

The concealable camera provided in the embodiments further includes the rotating member 13, and the rotating member 13 is configured to drive the reflecting component 12 to rotate when the reflecting component 12 extends out. Specifically, when image capturing is required, the retractable reflecting component 12 extends out, the rotating component drives the reflecting member 122 to rotate, and then the reflecting member 122 can receive the mirror images in different directions, so that the utilization rate of the camera is increased.

For example, when the mobile phone is required to use the rear camera for image capturing, the retractable reflecting member 122 can extend out of the shell 10 through the opening, and the rotating component can drive the reflecting component 12 to rotate 180° to receive the mirror image behind the mobile phone to complete image capturing the scenery behind. In such a manner, the front camera and the rear camera use the same image capturing assembly, so that the utilization rate of the camera can be effectively increased, and meanwhile, slotting for mounting the rear camera on the back surface of the electronic device is also avoided to improve the aesthetics and integrity of the appearance of the mobile phone.

In addition, in the related art, the pixels of the front camera is usually lower than the pixels of the rear camera, while in the embodiments, the front camera and the rear camera share the same image capturing assembly and the image capturing assembly 11 is not required to extend and retract and is less limited by the space, so that it can be ensured that both the front camera and the rear camera have high pixels, and camera image capturing performance of the camera is improved.

Various embodiments of the present disclosure can have one or more of the following advantages.

The electronic device having a concealable camera includes the shell, as well as the image capturing assembly and a retractable reflecting component which are arranged in the shell, the opening through which the reflecting component extends out of the shell is formed in the shell, and the reflecting component is configured to, during image capturing, extend out through the opening and reflect the received mirror image onto the image capturing assembly for imaging of the image capturing assembly. That is to say, the reflecting component extends and retracts to reflect the mirror image to the image capturing assembly by use of a reflecting action of the reflecting component to achieve an imaging purpose. When the camera is required by image capturing, the retractable reflecting component extends out through the opening in the shell, the external mirror image irradiates the reflecting component, the reflecting component reflects the received mirror image onto the image capturing assembly, the image capturing assembly executes a corresponding imaging operation according to the reflected mirror image.

Correspondingly, after image capturing is completed, the camera is not used, the retractable reflecting component retracts into the shell through the opening in the shell. In such a manner, in a process of using the camera for image capturing, the image capturing assembly is fixedly arranged in the shell, and a circuit board of the image capturing assembly is not required to slide for cooperating with the image capturing assembly and can also be fixedly arranged in the shell, so that the image capturing assembly can be effectively protected, meanwhile, a space required by the whole camera image capturing assembly can be reduced, a risk in damage to the circuit board is reduced, a purpose of reducing the cost and the space is achieved, a relatively high screen-to-body ratio of the electronic device is ensured, a ratio of an image capturing assembly to the space is also reduced, fabrication cost is reduced, and a space utilization rate is increased. In addition, the image capturing assembly is arranged in the shell and is less limited by the space, which is favorable for improving pixels of the image capturing assembly.

Other implementation solutions of the present disclosure will be apparent to those skilled in the art from consideration of the specification and practice of the present disclosure. This disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombinations.

Moreover, although features can be described above as acting in certain combinations and even initially claimed as such, one or more features from a claimed combination can in some cases be excised from the combination, and the claimed combination can be directed to a subcombination or variations of a subcombination.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present disclosure is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. An electronic device having a concealable camera, comprising:
a shell;
an image capturing assembly; and
a retractable reflecting component arranged in the shell;
wherein an opening through which the reflecting component extends out of the shell is formed in the shell;
the reflecting component is configured to, during camera image capturing, extend out through the opening and reflect a received mirror image onto the image capturing assembly for imaging of the image capturing assembly,
the reflecting component comprises a retractable member and a reflecting member, and the retractable member is configured to drive the reflecting member to extend out of or retract into the shell through the opening,
the electronic device having the concealable camera further comprises a rotating member configured to drive the reflecting component to rotate when the reflecting component extends out of the shell, and the rotating member is arranged between the reflecting member and the retractable member, and
the reflecting member comprises a protective housing, a reflecting mirror positioned in the protective housing, and a first rotating shaft arranged in the protective housing, and the protective housing is connected with one end of the rotating member through the first rotating shaft.

2. The electronic device having a concealable camera of claim 1, wherein one end of the rotating member is connected with the reflecting member, and other end of the rotating member is connected with the retractable member.

3. The electronic device having a concealable camera of claim 1, wherein the rotating member is a rotating motor, the rotating motor comprises a second rotating shaft, and the second rotating shaft of the rotating motor cooperates with the first rotating shaft to drive the reflecting mirror through the first rotating shaft to rotate.

4. The electronic device having a concealable camera of claim 3, wherein the retractable member is a stepper motor, a linear shaft at one end of the stepper motor cooperates with the rotating member, and other end of the stepper motor is fixedly arranged in the shell.

5. The electronic device having a concealable camera of claim 3, wherein an angle by which the second rotating shaft drives the reflecting component to rotate is 0° to 360°.

6. The electronic device having a concealable camera of claim 3, wherein a bump is arranged on a sidewall of the second rotating shaft of the rotating motor, and a groove matched with the bump is formed in a surface, facing the rotating motor, of the first rotating shaft.

7. A concealable camera, comprising an image capturing assembly and a retractable reflecting component, wherein the reflecting component is configured to, during image capturing, extend out and reflect a received mirror image onto the image capturing assembly for imaging of the image capturing assembly, the reflecting component comprises a retractable member and a reflecting member, and the retractable member is configured to drive the reflecting member to extend out or retract, the concealable camera further comprises a rotating member configured to drive the reflecting component to rotate when the reflecting component extends out, and the rotating member is arranged between the reflecting member and the retractable member, and the reflecting member comprises a protective housing, a reflecting mirror positioned in the protective housing, and a first rotating shaft arranged in the protective housing, and the protective housing is connected with one end of the rotating member through the first rotating shaft.

8. The concealable camera of claim 7, wherein one end of the rotating member is connected with the reflecting member, and other end of the rotating member is connected with the retractable member.

9. The concealable camera of claim 7, wherein the rotating member is a rotating motor, the rotating motor comprises a second rotating shaft, and the second rotating shaft of the rotating motor cooperates with the first rotating shaft to drive the reflecting mirror through the first rotating shaft to rotate.

10. The concealable camera of claim 9, wherein:
the retractable member is a stepper motor, and a linear shaft of the stepper motor cooperates with the rotating member;
an angle by which the second rotating shaft drives the reflecting component to rotate is 0° to 360°; and
a bump is arranged on a sidewall of the second rotating shaft of the rotating motor, and a groove matched with the bump is formed in a surface, facing the rotating motor, of the first rotating shaft.

11. A mobile phone having a concealable camera comprising:
a shell;
an image capturing assembly; and
a retractable reflecting component arranged in the shell;
wherein an opening through which the reflecting component extends out of the shell is formed in the shell; and
the reflecting component is configured to, during camera image capturing, extend out through the opening and reflect a received mirror image onto the image capturing assembly for imaging of the image capturing assembly;
wherein the mobile phone further comprises a display screen,
the reflecting component comprises a retractable member and a reflecting member, and the retractable member is configured to drive the reflecting member to extend out of or retract into the shell through the opening,
the mobile phone having the concealable camera further comprises a rotating member configured to drive the reflecting component to rotate when the reflecting component extends out of the shell, and the rotating member is arranged between the reflecting member and the retractable member, and
the reflecting member comprises a protective housing, a reflecting mirror positioned in the protective housing, and a first rotating shaft arranged in the protective housing, and the protective housing is connected with one end of the rotating member through the first rotating shaft.

12. The mobile phone of claim 11, wherein:
after image capturing is completed, the retractable reflecting component is configured to retract into the shell through the opening in the shell; and
in a process of image capturing, the image capturing assembly is fixedly arranged in the shell, and a circuit board of the image capturing assembly is configured not to slide for cooperating with the image capturing assembly and is also fixedly arranged in the shell to thereby protect the image capturing assembly and the circuit board is reduced.

* * * * *